Patented Feb. 14, 1950

2,497,320

UNITED STATES PATENT OFFICE 2,497,320

STABILIZED MILK PRODUCTS

Daniel K. O'Leary, Kennett Square, Pa., assignor to E. I. du Pont de Nemours & Company, Wilmington, Del., a corporation of Delaware No Drawing. Application February 12, 1946, Serial No. 647,209

3 Claims. (Cl. 99—151)

This invention relates to the stabilization of milk and milk products and more particularly to their stabilization with substituted beta-mercaptopropionic acids or esters. This application is a continuation in part of my U. S. Patent 2,397,976, filed July 25, 1942, issued April 9, 1946.

It is known that whole milk and especially dried whole milk develops on storage an oxidized flavor. This objectionable flavor can be avoided in dried whole milk during storage periods up to as much as two years depending upon the method of the preparation of the milk by the addition of certain antioxidizing agents. A number of antioxidizing agents have been proposed for this purpose but due inter alia to their high cost, toxicity, or objectionable flavor, their commercial use has not been favored.

An object of the present invention is to provide improved stabilized milk and milk products. Another object is to provide agents for milk or milk products which retard or inhibit their deterioration or prolong the period during which an oxidized flavor develops, the agents being free from disadvantageous properties of agents heretofore employed for this purpose. Still another object is to provide substituted 3-mercaptopropionic acids and their esters as rancidity inhibitors for use in milk and milk products. Other objects and advantages of the invention will hereinafter appear.

These objects are accomplished in accord with the invention by stabilizing milk or milk products such as condensed milk, evaporated milk, dried milk, cheese, whey, curd, frozen cream, ice cream, butter and butter oil against oxidation by the presence therein of a substituted 3-mercaptopropionic acid or ester by which is meant compounds containing the group

ROOCCH$_2$CH$_2$S—X in which R is hydrogen, an alkyl, aryl, aralkyl or alicyclic group and in which the monovalent substituent X of the sulfur group is a hydrocarbon. The formula represents such compounds as 3-[Y mercapto]propionic acid in which Y is a methyl, ethyl, propyl, butyl, lauryl, phenyl, benzyl, naphthyl, (P-methoxy) phenyl, (P-hydroxy) phenyl, cyclohexyl group or the like; is an oxygenated-hydrocarbon group such as hydroxymethyl, hydroxyethyl, hydroxypropyl, methoxymethyl, ethoxyethyl, or the like; a sulfur-hydrocarbon group such as mercaptoethyl, mercaptopropyl, mercaptohexyl or the like; oxygenated-hydrocarbon group illustrated by the compounds 3-[hydroxymethyl mercapto]propionic acid (HOOCCH$_2$CH$_2$SCH$_2$OH), 3-[hydroxyethyl mercapto]propionic acid (HOOCCH$_2$CH$_2$SCH$_2$CH$_2$OH)

3-[hydroxypropyl mercapto]propionic acid (HOOCCH$_2$CH$_2$SCH$_2$CH$_2$CH$_2$OH)

3-[methoxymethyl mercapto]propionic acid (HOOCCH$_2$CH$_2$SCH$_2$OCH$_3$)

3-[carboxyethyl mercapto]propionic acid (HOOCCH$_2$CH$_2$SCH$_2$CH$_2$COOH)

or the like. If the product is to be used for human consumption only the non-toxic derivatives are used.

The above hydrocarbon, alcohol, ether, aldehyde, ester, and other derivatives of 3-mercaptopropionic acids are excellent inhibitors of the development of oxidation flavors as are also the esters. The methyl, ethyl, propyl, butyl, lauryl, myristyl, cetyl, stearyl, and other straight, branch chain or cyclic esters may be used.

The inhibitor may be added to the milk in its liquid form or to the products made therefrom. It appears to be immaterial whether the inhibitor is added to the milk before or after conversion to the evaporated or dried form for in either case a stabilized product is obtained inhibited against the formation of the oxidized flavor. Usually the addition of from 0.05 to 1% of the inhibitor is ample to obtain optimum inhibition with a preferred range between 0.1 and about 0.5%.

The table illustrates the result of stabilizing fluid milk and whole milk powder by the addition thereto of dialkyl esters of thiodipropionic acid.

Table

| | Run | Treatment | Days Storage of Sample Before Oxidative Flavor changes were noted | |
|---|---|---|---|---|
| | | | Untreated | Treated |
| Fluid Milk: Treatments made on milk basis; samples stored at 42° F. | 1 | Dilauryl TDP[1] 0.10% | 5 | >7 |
| | 2 | do | 2 | 6 |
| Whole Milk Powder: Treatments applied to the fluid milk on basis of an assumed 4% fat content; samples stored at 120° F. | 3 | Dioctyl TDP 0.50% | 17 | ca. 180 |
| | 4 | Dilauryl TDP 0.50% | 14 | ca. 180 |
| | 5 | Dilauryl TDP 0.50% | 26 | ca. 150 |

[1] Thiodipropionic acid (or 3-[carboxyethyl mercapto]propionic acid).

It will be noted that with whole milk no oxidation flavor was detected up to seven days or more in one instance and six days in another for fluid milk while with whole milk powder no oxidation flavor was detected at 180 days at which time the accelerated test on the whole milk powder was discontinued.

Homogenized milk may be similarly benefited by the presence of thiodipropionic acid, its esters or the other oxidation inhibiting agents described above. Their utility in this field is illustrated by this example. 50 gallons of milk were treated with about 0.05% dilauryl thiodipropionic acid, the resulting mixture homogenized and then stored at a temperature of 42° F. The resulting homogenized product was oxidation-free for 72 hours beyond the controls which were oxidized in 48 hours.

Butter oil has been stabilized by the direct addition of about 0.03% by weight thereto of thiodipropionic acid and its esters. The resulting product was evaluated by the Swift test procedure. Comparative tests were made on a sample containing thiodipropionic acid in the amount of 0.10% and one treated with dilauryl thiodipropionic acid present in the same amount. These samples were compared with a control containing no agent. According to this accelerated stability testing method which operates at 99° C. stability values were greater than 115, 105, and 17 hours respectively for the acid treated, ester treated, and untreated product. The Swift method is described in "Oil and Soap" 10, 105–109 (1933) in an article by A. E. King et al., "An accelerated stability test using the peroxide value as an index."

The effectiveness of the agents appears to be general for dairy products whether they are used in solid or liquid form and their utility is exemplified by their ability to maintain the pleasant flavors and to suppress unpleasant flavors in such food products for considerable periods of time.

I claim:

1. A product of the group consisting of milk, condensed milk, evaporated milk, and dried milk to which has been added from 0.05 to 1% by weight of a 3-(mercapto)propionic compound having the linear structural formula $$ROOCCH_2CH_2S-X$$

in which R is of the group consisting of hydrogen and hydrocarbon groups and in which the monovalent substituent X is an oxygenated hydrocarbon.

2. Milk to which has been added 0.05 to 1% by weight of a 3-carboxyethyl mercapto propionic acid.

3. Milk to which has been added 0.05 to 1% by weight of a 3-carboxyethyl mercapto propionic ester.

DANIEL K. O'LEARY.

REFERENCES CITED

The following references are of record in the file of this patent:

UNITED STATES PATENTS

| Number | Name | Date |
|---|---|---|
| 2,397,960 | Gribbins et al. | Apr. 9, 1946 |
| 2,397,976 | O'Leary | Apr. 9, 1946 |
| 2,416,052 | Gribbins | Feb. 18, 1947 |